United States Patent
Boss et al.

(10) Patent No.: US 10,081,103 B2
(45) Date of Patent: Sep. 25, 2018

(54) WEARABLE DEVICE TESTING

(71) Applicant: International Business Machines Corporation, Armonk, NY (US)

(72) Inventors: Gregory J. Boss, Saginaw, MI (US); John E. Moore, Jr., Brownsburg, IN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 15/184,121

(22) Filed: Jun. 16, 2016

(65) Prior Publication Data

US 2017/0361460 A1    Dec. 21, 2017

(51) Int. Cl.
| | |
|---|---|
| B25J 9/00 | (2006.01) |
| B25J 9/16 | (2006.01) |
| B25J 9/10 | (2006.01) |
| B25J 19/00 | (2006.01) |
| G06F 11/22 | (2006.01) |

(Continued)

(52) U.S. Cl.
CPC .............. B25J 9/16 (2013.01); B25J 9/0072 (2013.01); B25J 9/106 (2013.01); B25J 19/0095 (2013.01); G06F 11/2221 (2013.01); *B25J 19/023* (2013.01); *B25J 19/027* (2013.01); *B25J 19/028* (2013.01); *G05B 2219/31295* (2013.01); *G05B 2219/37388* (2013.01); *G06F 3/017* (2013.01); *G06F 2203/04104* (2013.01)

(58) Field of Classification Search
CPC ........ B25J 19/023; B25J 9/0072; B25J 9/106; B25J 19/0095; B25J 19/028; B25J 19/027; B25J 9/16; Y10S 901/02; Y10S 901/30; G06F 11/2221; G06F 2203/04104; G06F 3/014; G06F 3/017; G06F 3/044; G05B 2219/37388; G05B 2219/31295

See application file for complete search history.

(56) References Cited

U.S. PATENT DOCUMENTS

| | | | | |
|---|---|---|---|---|
| 6,008,636 | A * | 12/1999 | Miller | .................... G01R 31/01 324/757.01 |
| 8,761,938 | B2 * | 6/2014 | Jenkinson | .............. B25J 9/1697 700/259 |
| 9,144,528 | B2 | 9/2015 | Agrawal et al. | |

(Continued)

FOREIGN PATENT DOCUMENTS

WO    2015127059 A2    8/2015

OTHER PUBLICATIONS

Amini et al.; "Accelerometer-based on-body sensor localization for health and medical monitoring applications☆"; Pervasive and Mobile Computing 7; 2011; pp. 746-760; Elsevier.

(Continued)

*Primary Examiner* — Jason Holloway
(74) *Attorney, Agent, or Firm* — Alexa Ashworth; A. Imtiaz Billah; Brian M. Restauro

(57) ABSTRACT

Embodiments of the present invention provide methods and systems to analyze wearable technology. A robot with snake assembly works in conjunction with a server in order to simulate the locomotive actions of appendages and to concomitantly determine the response of wearable technology devices, which are attached to the snake robot assembly, to the simulated locomotive actions.

18 Claims, 6 Drawing Sheets

(51) Int. Cl.
*B25J 19/02* (2006.01)
*G06F 3/01* (2006.01)

(56) References Cited

U.S. PATENT DOCUMENTS

| | | | | |
|---|---|---|---|---|
| 9,283,672 | B1* | 3/2016 | Matthews | G01M 99/008 |
| 9,469,037 | B2* | 10/2016 | Matthews | G01M 99/008 |
| 9,718,196 | B2* | 8/2017 | Matthews | B25J 19/023 |
| 9,798,314 | B2* | 10/2017 | Dougherty | G05B 19/402 |
| 2010/0300230 | A1* | 12/2010 | Helmer | B25J 9/106 |
| | | | | 74/469 |
| 2011/0245738 | A1 | 10/2011 | Agrawal et al. | |
| 2013/0158444 | A1* | 6/2013 | Herr | A61H 1/0255 |
| | | | | 601/23 |
| 2013/0200916 | A1* | 8/2013 | Panagas | G01R 1/0441 |
| | | | | 324/757.01 |
| 2013/0304604 | A1* | 11/2013 | Hoffman | G06Q 30/0621 |
| | | | | 705/26.5 |
| 2013/0317650 | A1* | 11/2013 | Jenkinson | B25J 9/1697 |
| | | | | 700/259 |
| 2014/0064601 | A1* | 3/2014 | Ramachandran | B25J 9/1697 |
| | | | | 382/153 |
| 2014/0098018 | A1 | 4/2014 | Kim et al. | |
| 2014/0141726 | A1* | 5/2014 | Schlub | G01R 29/0857 |
| | | | | 455/67.12 |
| 2015/0126129 | A1* | 5/2015 | Rangappagowda | H04W 24/06 |
| | | | | 455/67.11 |
| 2015/0217444 | A1* | 8/2015 | Asada | B25J 5/00 |
| | | | | 700/258 |
| 2015/0355279 | A1* | 12/2015 | Rogel-Favila | G01R 31/2893 |
| | | | | 324/750.25 |
| 2016/0167238 | A1* | 6/2016 | Matthews | G01M 99/008 |
| | | | | 73/118.01 |
| 2017/0028569 | A1* | 2/2017 | Matthews | G01M 99/008 |
| 2017/0052527 | A1* | 2/2017 | Dougherty | G05B 19/402 |

OTHER PUBLICATIONS

Cavalcanti; "Olin Snake Robots"; Imagination Fabrication; Printed Mar. 18, 2016; 3 pages; <http://imaginationfabrication.com/olin-serpentine-snake/>.

Dowling; "Limbless Locomotion: Learning to Crawl with a Snake Robot"; Submitted in partial fulfillment of the requirements for the degree of Doctor of Philosophy in Robotics; The Robotics Institute, Carnegie Mellon University; Dec. 1997; pp. 1-144.

Palermo; "Snake Robots! Slithering Machines Could Aid Search-and-Rescue Efforts"; livescience; Oct. 9, 2014; 9 pages; <http://www.livescience.com/48225-sidewinding-snake-robots.html>.

Perez et al.; "Upper Limb Portable Motion Analysis System Based on Inertial Technology for Neurorehabilitation Purposes"; Sensors 2010, 10, doi:10.3390/s101210733; Published: Dec. 2, 2010; pp. 10733-10751.

Shisheie et al.; "Modeling and Control of a Bidirectional Twisted-String Actuation for an Upper Arm Robotic Device"; 2015 American Control Conference; Jul. 1-3, 2015; pp. 5794-5799; IEEE.

Simbra; "Snake Robots Could Be Used to Assist Heart Surgery"; CBS Pittsburgh; Jul. 3, 2012; 4 pages; <http://pittsburgh.cbslocal.com/2012/07/03/snake-robots-could-be-used-to-assist-heart-surgery/>.

"Wearable electronic device"; An IP.com Prior Art Database Technical Disclosure; IP.com No. IPCOM000240005D; Dec. 22, 2014; 27 pages.

* cited by examiner

US 10,081,103 B2

WEARABLE DEVICE TESTING

BACKGROUND OF THE INVENTION

The present invention relates generally to system analysis and more specifically to analyzing wearable technology.

Wearable technologies are clothing and accessories incorporating computer and advanced electronic technologies. The designs of these wearable technologies often incorporate practical functions and features such as a display screen. Wearable technologies behave as computing devices embedded with electronics, software, sensors, and connectivity modules to enable objects to exchange data with a manufacturer, operator and/or other connected devices, without requiring human intervention.

SUMMARY

According to one embodiment of this present invention, a system for analyzing wearable technology is provided, wherein the system comprises: a plurality of wearable devices; a robotic device, configured to attach the plurality of wearable devices; and a server, operatively coupled to the robotic device.

According to another embodiment of this present invention, a method for analyzing wearable technology is provided, wherein the method comprises the steps of: receiving, by one or more processors, a plurality of wearable devices; simulating, by one or more processors, a plurality of gestures using a robotic device; and communicating, by one or more processors, data associated with the plurality of gestures, to a server.

According to yet another embodiment of this present invention, a computer program product for analyzing wearable technology is provided, wherein the computer program product comprises: a computer readable storage medium and program instructions stored on the computer readable storage medium, wherein the program instructions comprise: program instructions to receive a plurality of wearable devices; program instructions to simulate a plurality of gestures using a robotic device; and program instructions to communicate data associated with the plurality of gestures, to a server.

DETAILED DESCRIPTION

Wearable technology, such as most wearable devices, have accelerometers which are able to detect and control gestures by using a multitude of built-in sensors. Improper gesture recognition may result in improper control of devices and malfunctions. In some cases, this can result in harm or injury. Thus, the testing of wearable device gesture controls may prove to be a critical process prior to releasing a wearable device to a consumer market. One difficulty encountered in testing wearable device gestures is performing comprehensive tests on a large volume of devices using known techniques in the art, in an efficient and effective manner. Furthermore, a method which tests a large volume of wearable devices more effectively and comprehensively may prove to be beneficial to advancing wearable technology and more specifically wearable devices. Embodiments of the present invention describe methods and systems which effectively increase the number of mobile/wearable devices that can be simultaneously tested using 3-axis movements. These disclosed systems involve methods which monitor for failures in real time along the entire test set (i.e., a set/plurality of wearable devices) and propagate the target test case for all of the other devices to rule out outliers and false positives.

Some embodiments of the present may include one, or more, of the following features, characteristics, and/or advantages: (i) allows developers of hardware and software for wearable devices to use a robotic device (or the equivalent of the robotic device) to simulate gestures; (ii) reducing the need for human beings to perform the simulation of gestures; and/or (iii) allows developers to "stress" the wearable device and look for delays in performance by programmatically providing constant and variable timing, which is calculated in a more predictable fashion than which a human being is able to do.

Figure 1:
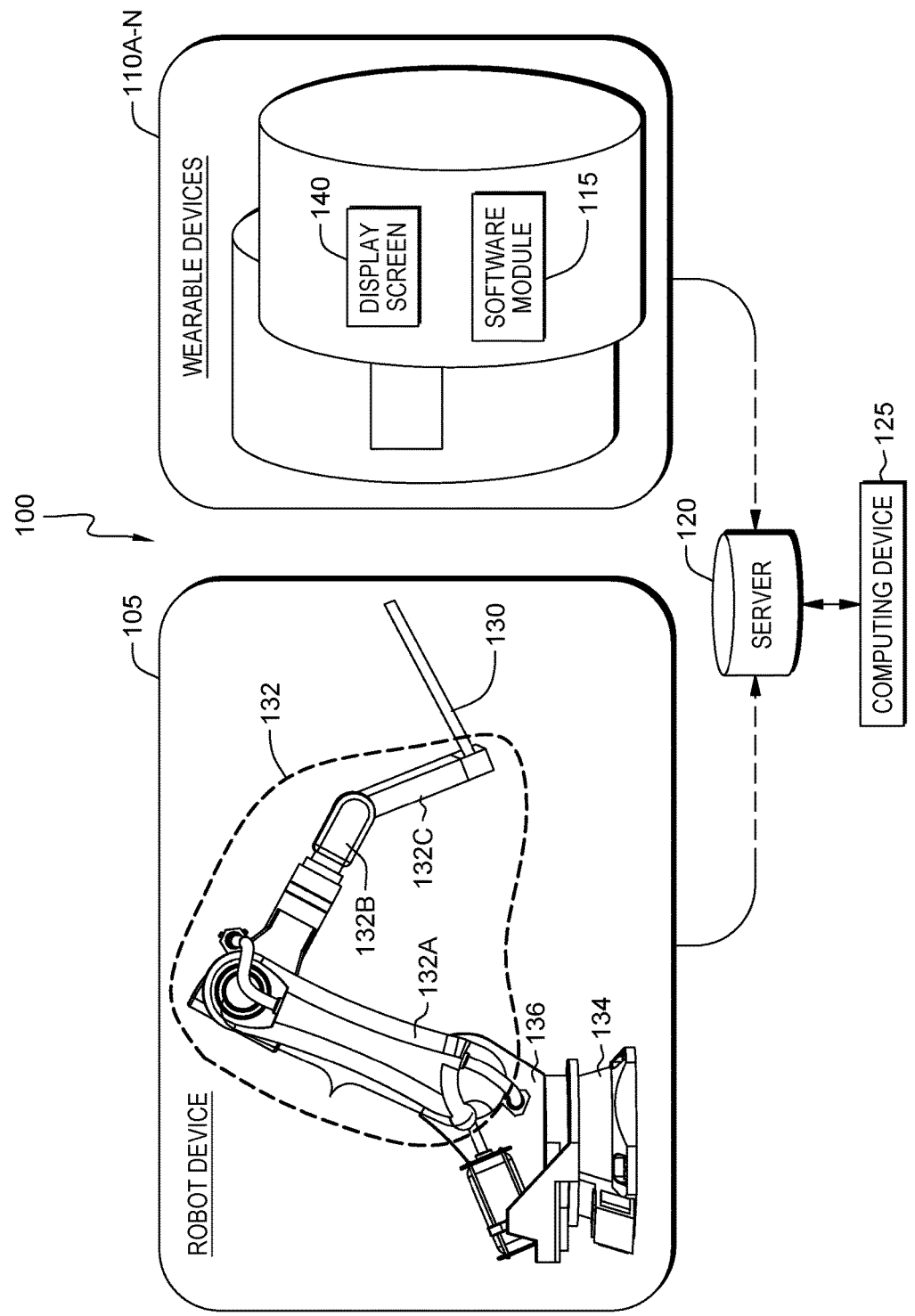
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes robot device 105 and wearable devices 110A-N connected to computing device 125 via server 120.

A network (which is not pictured) such as a local area network (LAN), a wide area network (WAN) such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols enable communications between robot device 105, wearable devices 110A-N, server 120, and computing device 125, in accordance with embodiments of the invention. The network may include wired, wireless, or fiber optic connections.

Server 120 is designed to share resources among the computing device 125, robot device 105, and wearable devices 110A-N. Server 120 receives signals from the wearable devices 110A-N and the relative position of each rib unit of body 130 within robot device 105. In an exemplary embodiment, server 120 is a computer which often has faster processors, more memory, and more storage space than the client devices (i.e., computing device 125, robot device 105, and wearable devices 110A-N). Server 120 typically uses multiple processors (excluding multi-core central processing units), contains many gigabytes of installed memory, and has one or more server-optimized network interface cards (NICs), RAID (Redundant Array of Independent Drives) storage, which include multiple drives and redundant power supplies. Servers often run a special network operating system, which is designed solely to facilitate the sharing of resources. In this exemplary embodiment, a single unit of server 120 is used in data processing environment 100. In other embodiments, multiple units of server 120 may be used.

Computing device 125 is a client computer which typically communicates only with server 120. Computing device 125 is running an operating system which allows the user to access data and resources from server 120, wearable devices 110A-N, and robot device 105. A network (which is not pictured in FIG. 1) enables communications between server 120, wearable devices 110A-N, and robot device 105.

Wearable devices 110A-N are types of wearable technology containing display screen 140. Smart watches, activity trackers, and GPS watches are examples of wearable devices 110A-N. Wearable devices 110A-N are miniature electronic devices which can be worn under, with, or on top of clothing. Wearable devices 110A-N have been developed for general or special purpose information technologies and media development with computing capabilities. Wearable devices 110A-N are especially useful for applications that require more complex computational support, such as accelerometers or gyroscopes as opposed to hardware coded logic found in most computing devices reminiscent of computing device 125. Some applications of wearable devices 110A-B are: sensory integration; behavioral modeling; health care monitoring systems; service management; and integrating mobile phones and other devices with each other. A single unit of software module 115 resides within wearable devices 110A-N.

In this exemplary embodiment, display screen 140 is composed of, for example, a liquid crystal display screen, an organic light emitting diode display screen, or other types of display screens. Display screen 140 contains user interfaces and touch screen capability.

A single unit of software module 115 is installed within each unit of wearable devices 110A-N. Software module 115 identifies the location, position, and possible gripping directions of untested wearable devices among wearable devices 110A-N. Software module 115 works in conjunction with accelerometers and gyroscopes to process gestures.

Robot device 105 behaves as a snake robot. Snake robots are able to mimic the locomotive movements of snakes. In other words, snake robots are able to perform sliding and shimmying movements across a surface. Body 130 is a portion of robot device 105 which is able to change shape. Movements and changes in the shape of body 130 are referred to as a specific gait, which is a periodic mode of locomotion. Typical gaits associated with body 130 of robot device 105 are sidewinding and lateral undulation. Legs are not applied in robot device 105 because legs (and similar structures) get stuck in ruts or held up in bumps along a path. The sliding movement of robot device 105 permits robot device 105 to access areas which humans and other types of robotic devices would not be able to access. Robot device 105 wears wearable devices 110A-N and performs movements along body 130 to simulate gestures. The 3-axis system of robot device 105 is represented by the entirety of arm 132, wherein arm 132 includes sub-arm 132A, sub-arm 132B, and sub-arm 132C. Base 134 is a physical support structure for arm 132. Within base 134, a computing utility is applied in order to gather signals from server 120, process gestures, and send the processed gestures to server 120. Part 136 enables arm 132 and the accompanying body 130 to move in a 360 degree circle. Sub-arm 132A is connected directly to part 136. Sub-arms 132A, 132B, and 132C contain structural elements which permits the position and length of arm 132 to be modified. Sub-arm 132C is connected to body 130. Body 130 is described in more detail with respect to FIG. 2, FIG. 3A, and FIG. 3B. Body 130 is the portion/unit of robot device 105 which wears wearable devices 110A-N and simulates gestures by moving (e.g., slithering) as a snake typically moves. In FIG. 1, the robotic structure of robot device 105 is depicted as having a single snake robot assembly (i.e., a single component which has a snake robot type assembly). In other embodiments, the robotic structure of robot device 105 may have a multiple snake robot assembly.

Connectivity modules (which are not pictured) reside within wearable devices 110A-N. These connectivity modules contain a baseband processor that manages all the radio or any functions that require an antenna, such as WiFi and Bluetooth functions, for connecting to a wireless network, such as the Internet, and for connecting to other devices.

Figure 2:
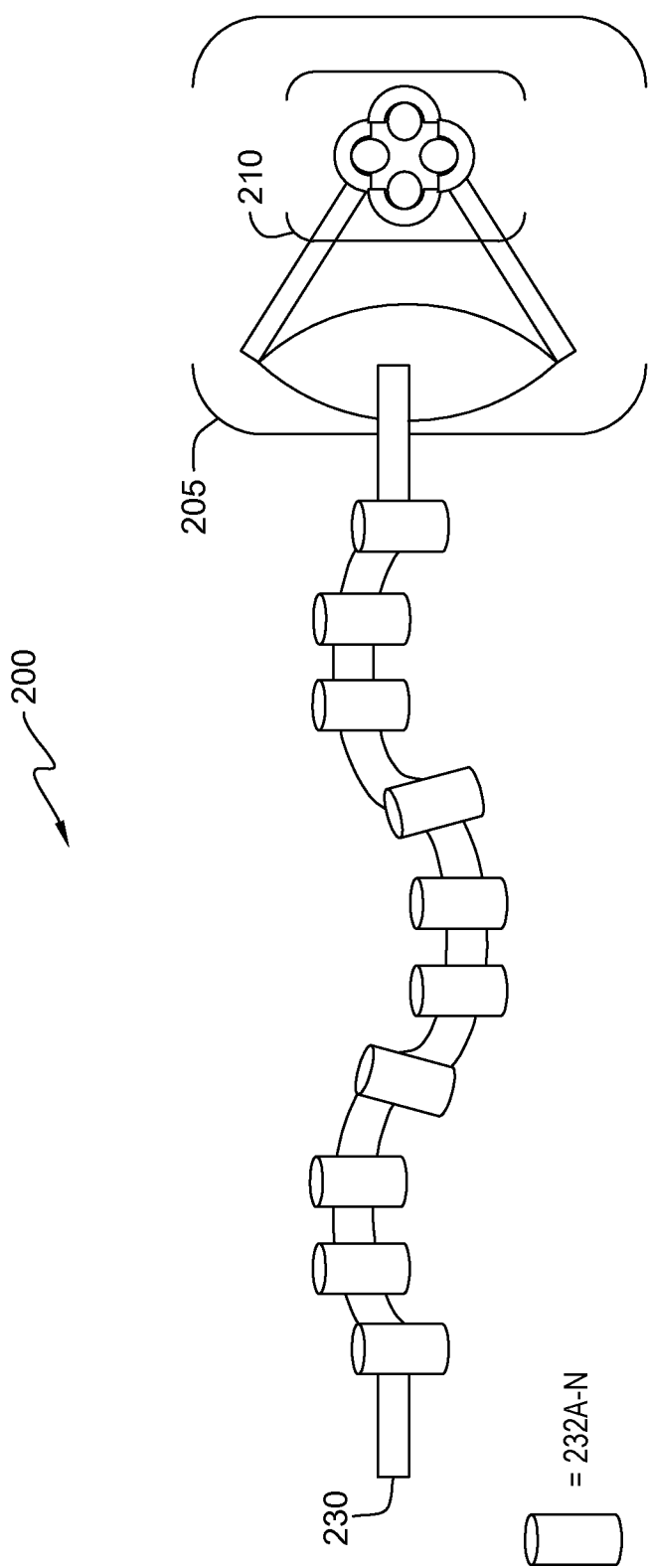
FIG. 2 is a block diagram depicting a snake robot, in accordance with an embodiment of the present invention.

FIG. 2 is a block diagram depicting the body portion of a snake robot, in accordance with an embodiment of the present invention.

In this exemplary embodiment, diagram 200 illustrates a structure which resembles body 130 in more detail. Gait body 230 has ribs 232A-N and is attached to nose 205. Nose 205 contains a conical base and appendage 210. Appendage 210 is a four pronged structure. Each prong is represented by the darkened circles within appendage 210. Appendage 210 mimics the motion of opening and closing a human fist. A single unit among wearable devices 110A-N is fit over a single unit of ribs 232A-N. Once gait body 230 wears wearable devices 110A-N, a movement is performed to simulate a requested gesture. In FIG. 2, gait body 230 is depicted as a wave, as opposed to a straight line, in order to represent a gait body undergoing sinusoidal movement. The dimensions of ribs 232A-N can be altered in order to ensure wearable devices 110A-N are tightly fit to gait body 230 and wearable devices 110A-N do not fall off ribs 232A-N when gait body 230 undergoes a movement to simulate a gesture.

Figure 3A:
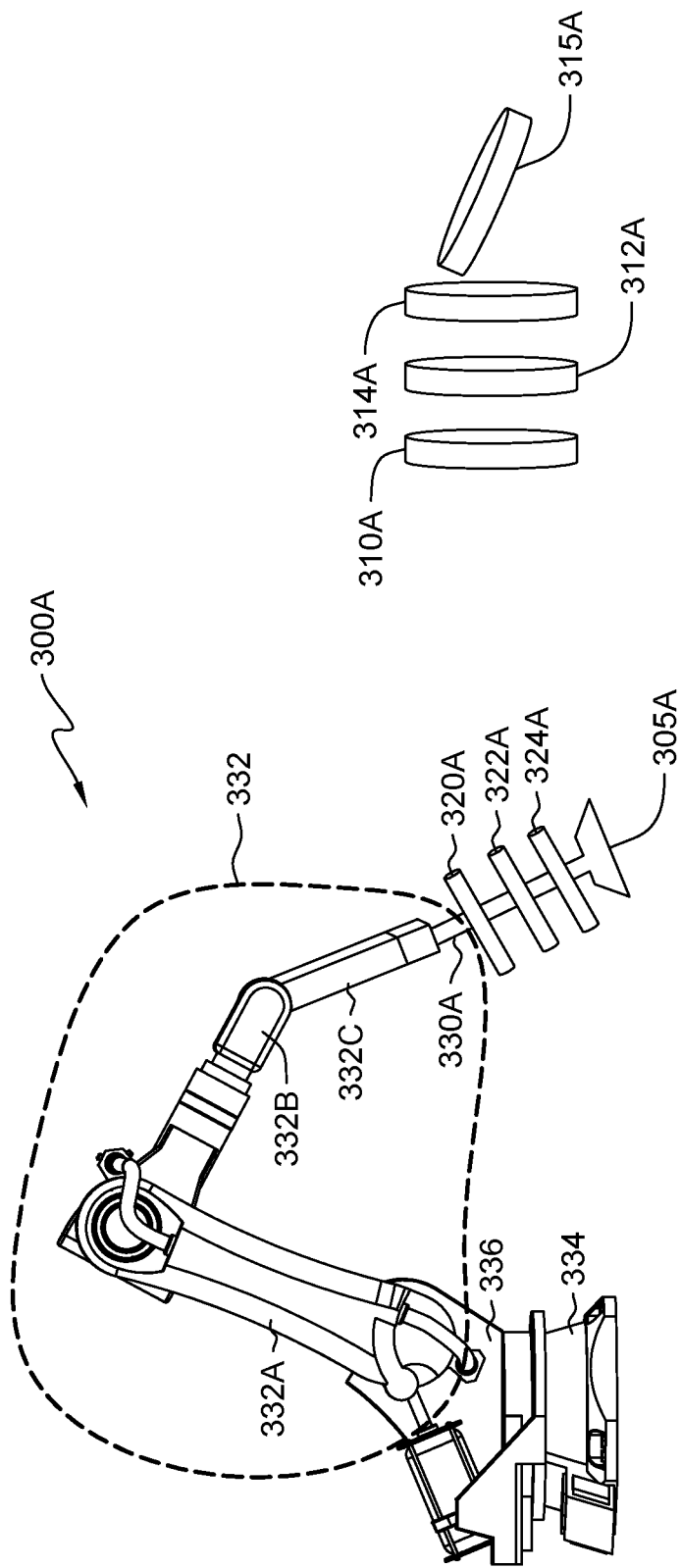
FIG. 3A is a block diagram depicting a snake robot prior to attaching wearable devices, in accordance with an embodiment of the present invention.

FIG. 3A is a block diagram depicting the snake robot prior to attaching wearable devices, in accordance with an embodiment of the present invention.

Note: Wearable devices 110A-N reminiscent of wearable devices 310A, 312A, and 314A, are not attached to robot device 105.

Body 330A contains ribs 320A, 322A, and 324A. Wearable devices 310A, 312A, and 314A are to be tested for gesture testing and kept in a common place prior to be being attached to ribs 320A, 322A, and 324A. One or more units of robot device 300A have conical nose 305A which move around the heap of wearable devices 310A, 312A, and 314A. Conical nose 305A is capped by seal 315A. Robot device 105 contains base 334 which acts as a physical support structure for arm 332. Within base 334, a computing utility is applied in order to process gestures and send the processed gestures to server 120. Arm 332 includes sub-arm 332A, sub-arm 332B, and sub-arm 332C. Part 336 enables arm 332 to move in a 360 degree circle. Sub-arm 332A is connected directly to part 336. Sub-arms 332A, 332B, and 332C contain structural elements which enable the positioning and length of arm 332 to be modified. Sub-arm 332C is connected to body 330A. Wearable devices 310A, 312A, and 314A are put on ribs 320A, 322A, and 324A, respectively, in a "one by one" fashion.

Figure 3B:
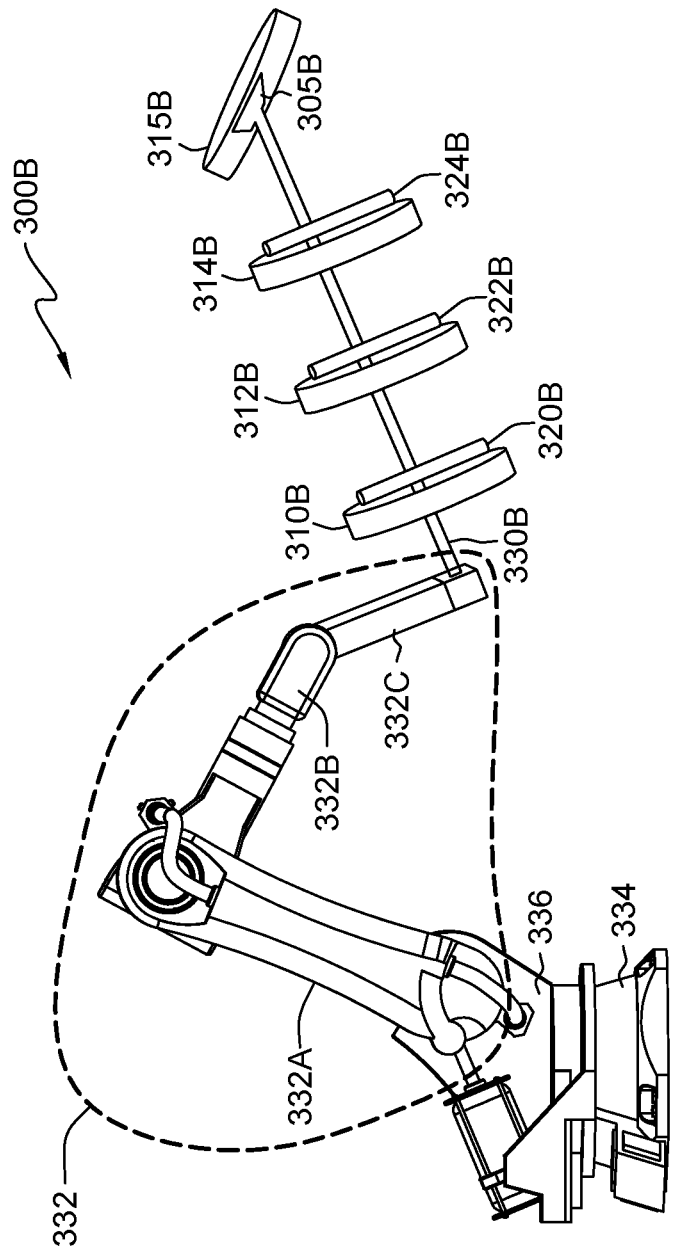
FIG. 3B is a block diagram depicting a snake robot attached to wearable devices, in accordance with an embodiment of the present invention.

FIG. 3B is a block diagram depicting the snake robot attached to wearable devices, in accordance with an embodiment of the present invention.

Note: Wearable devices 110A-N reminiscent of wearable devices 310B, 312B, and 314B, are tightly fitted to robot device 105.

Wearable devices 310B, 312B, and 314B are placed on ribs 320B, 322B, and 324C, respectively. The dimension of ribs 320B, 322B, and 324B have been adjusted automatically in order to make a tight fit with wearable devices 310B, 312B, and 314B and body 330B. Conical nose 305B is capped by seal 315B. The position of arm 332 in conjunction with body 330B are performing movements to simulate the requested gesture. Within base 334, a computing utility is applied in order to process gestures and send the processed gestures to server 120. Arm 332 includes sub-arm 332A, sub-arm 332B, and sub-arm 332C. Part 336 enables arm 332 to move in a 360 degree circle. Sub-arm 332A is connected directly to part 336. Sub-arms 332A, 332B, and 332C contain structural elements which enable the positioning and length of arm 332 to be modified. Sub-arm 332C is connected to body 330A. Resultant signals derive from the response of wearable devices 310B, 312B, and 314C in response to simulated gestures performed by body 330B. The resultant signals are sent to and analyzed by server 120 (see FIG. 1 and FIG. 4).

Figure 4:
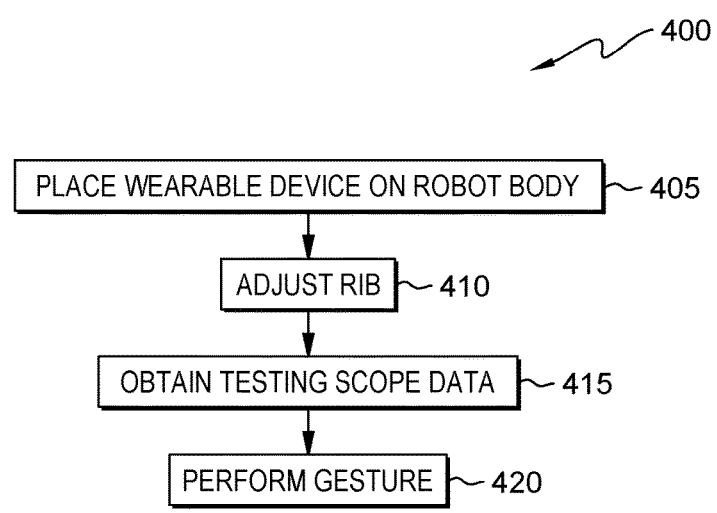
FIG. 4 is a flowchart depicting the steps performed by a snake robot, in accordance with an embodiment of the present invention.

FIG. 4 is a flowchart depicting the steps performed by a snake robot, in accordance with an embodiment of the present invention.

In flowchart 400, robot device 105 is performing steps 405, 410, 415, and 420.

In step 405, robot device 105 places wearable devices on the robot arm. Wearable devices 110A-N are placed over the ribs of body 130 wherein one rib unit receives a single unit among wearable devices 110A-N in a "one-by-one" fashion. Prior to placing wearable devices 110A-N on body 130 (i.e., wearable devices 110A-N are not attached to the robot body), wearable devices 110A-N are reminiscent of wearable devices 310A, 312A, and 314A (see FIG. 3A). After placing the wearable devices 110A-N on body 130 (i.e., wearable devices 110A-N are attached to the robot body), wearable devices 110A-N are reminiscent of wearable devices 310B, 312B, and 314B (see FIG. 3B).

In step 410, robot device 105 adjusts the ribs. Wearable devices 110A-N are attached to the ribs, however wearable devices 110A-N may or may not be tightly fitted to the ribs. The dimensions of the ribs of gait body 230 are automatically adjusted in order to make a tight fit with wearable devices 110A-N and body 130. The fitting elicits a signal which corresponds with the fit of wearable devices 110A-N over the ribs of body 130. A tighter fit corresponds to a different signal in comparison to a less tight fit. Based on the different signals, the tightness can be quantified and compared to a preconfigured threshold value which is used to correspond signals to a tight fit of wearable devices 110A-N over the ribs of body 130. Signals, corresponding to the fit of wearable devices 110A-N over the ribs of body 130, which meet or exceed the preconfigured threshold value are indicative of a tight fit of wearable devices 110A-N over the ribs of body 130.

In step 415, robot device 105 obtains testing scope data. Based on collected and tightly fitted wearable devices (such as wearable devices 310B, 312B, and 314B), robot device 105 gathers the gesture information to be tested from server 120. Wearable devices 110A-N in the form of wearable devices 310B, 312B, and 312B are securely fitted to body 130 as opposed to wearable devices 110A-N in the form of wearable devices 310A, 312A, and 314A (from FIG. 3A) are not fitted onto body 130. Robot device 105 processes a request to perform the gesture and determines a locomotive mode in order to perform the requested gesture.

In step 420, robot device 105 performs a gesture. The performed gesture is based on gesture information which is to be tested deriving from server 120 (i.e., the requested gesture to be performed). After processing the request and determining the mode to perform the requested gesture, robot device 105 performs the requested gesture. The one or more signals deriving from each collected and tightly fitted wearable device are collected. Gyroscopic sensors and accelerometers may be used to detect and obtain raw data associated with the responses of the wearable devices to the gesture performed by robot device 105. Furthermore, the rib number associated with a wearable device (attached to a rib) is used to validate the signal against the performed gesture. The signal will be validated in the remote server (i.e., server 120) and the test result may be validated. The validation results are shown in a dashboard type structure within server 120.

Figure 5:
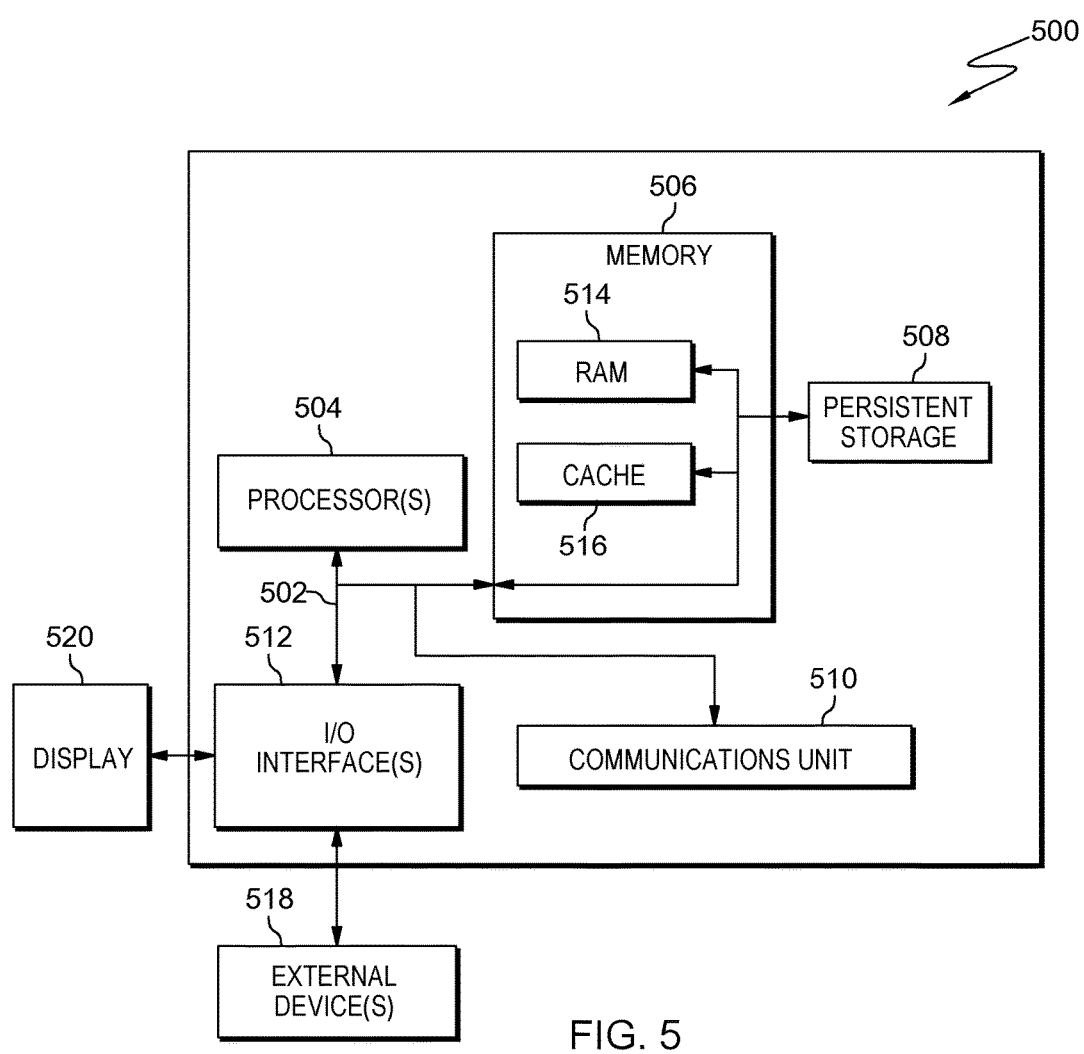
FIG. 5 depicts a block diagram of internal and external components of a computing device, in accordance with an embodiment of the present invention.

FIG. 5 depicts a block diagram of internal and external components of computing device 500, such as computing device 125 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for analyzing wearable technology, comprising:
   a plurality of wearable devices;
   a robotic device, configured to attach the plurality of wearable devices;
   a snake assembly of the robotic device, configured to mimic locomotive movements of a range of appendage movements using a pronged structure, wherein the pronged structure simulates a plurality of gestures;
   a first plurality of detection units of the robotic device, which obtain a response of the plurality of wearable devices to the plurality of gestures;
   a second plurality of detection units of the robotic device, which obtain a plurality of signals in response to simulating the plurality of gestures;
   a server, operatively coupled to the robotic device, wherein the server is configured to: (i) obtain the plurality of signals, and (ii) associate a response of a plurality of ribs in the snake assembly of the robotic device with the plurality of signals as a validation result, wherein:
      failures in real time among the plurality of wearable devices are identified in real-time based on the validation result, and
      a design of the plurality of wearable devices is modified in response to identifying the failures in real time among the plurality of wearable devices.

2. The system of claim 1, wherein the robotic device, comprises:
   a base configured to support an arm unit, wherein the arm unit is coupled to the snake assembly of the robotic device; and
   the plurality of ribs are configured to: receive the plurality of wearable devices and simulate the plurality of gestures.

3. The system of claim 1, wherein the plurality of wearable devices, comprise:
   a software module which enables communication between the server and the robotic device, and wherein the software module obtains a location of each unit of the plurality of wearable devices.

4. The system of claim 1, wherein the server, comprises:
   a processing unit which receives a plurality of requests to perform a plurality of gestures, wherein the plurality of gestures are sent to the robotic device.

5. The system of claim 2, wherein:
   a position of the arm unit coupled to the snake assembly of the robotic device is adjustable.

6. The system of claim 2, wherein the snake assembly of the robotic device, comprises:
   the plurality of ribs which receive the plurality of wearable devices, wherein one unit among the wearable devices is placed on one unit of the plurality of ribs prior to another unit among the wearable device being placed on another unit of the plurality of ribs; and
   wherein each unit of the plurality of ribs contain adjustable dimensions in order to tightly fit the plurality of wearable devices to the snake assembly.

7. A method for analyzing wearable technology, comprising:
   attaching, by one or more processors, a plurality of wearable devices to a snake assembly of a robotic device;
   mimicking, by one or more processors, locomotive movements of a range of appendage movements using a pronged structure of the snake assembly;
   simulating, by one or more processors, a plurality of gestures using the pronged structure;
   obtaining, by one or more processors, a response of the plurality of wearable devices to the plurality of gestures through a first plurality of detection units of the robotic device;
   obtaining, by one or more processors, a plurality of signals in response to simulating the plurality of gestures through a second plurality of detection units;
   connecting, by one or more processors, a server to the robotic device, wherein the server is configured to: (i) obtain the plurality of signals, and (ii) associate a response of a plurality of ribs in the snake assembly of the robotic device with the plurality of signals as a validation result;
   identifying, by one or more processors, failures in real time among the plurality of wearable devices based on the validation result; and
   modifying, by one or more processors, a design of the plurality of wearable devices in response to identifying the failures in real time among the plurality of wearable devices.

8. The method of claim 7, wherein the robotic device, comprises:
   a base which supports an arm unit with the snake assembly of the robotic device, wherein the arm unit is coupled to the snake assembly; and
   the plurality of ribs receive the plurality of wearable devices and simulate the plurality of gestures.

9. The method of claim 7, wherein obtaining the response of the plurality of wearable devices to the plurality of gestures through the first plurality of detection units of the robotic device, comprises:
   receiving, by one or more processors, a communication comprising a location of a wearable device of the plurality of wearable devices from a software module of the plurality of wearable devices.

10. The method of claim 7, further comprising:
receiving, by one or more processors, a plurality of requests to perform the plurality of gestures, from the server.

11. The method of claim 7, wherein receiving the plurality of wearable devices, comprises:
adjusting, by one or more processors, a position of an arm unit with the snake assembly of the robotic device in order for the snake assembly to receive the plurality of wearable devices.

12. The method of claim 8, wherein the snake assembly of the robotic device, comprises:
placing, by one or more processors, each unit of the plurality of wearable devices over the plurality of ribs, wherein one unit among the wearable devices is placed on one unit of the plurality of ribs prior to another unit among the wearable device being placed on another unit of the plurality of ribs; and
adjusting, by one or more processors, dimensions of each unit of the plurality of ribs, which contain a placed single unit of the plurality of wearable devices in order to tightly fit the plurality of ribs containing the plurality of wearable devices to the arm unit.

13. A computer program product for analyzing wearable technology, the computer program product comprising:
a non-transitory computer readable storage medium and program instructions stored on the non-transitory computer readable storage medium, the program instructions comprising:
program instructions to attach a plurality of wearable devices to a snake assembly of robotic device;
program instructions to mimic locomotive movements of a range of appendage movements using a pronged structure of the snake assembly;
program instructions to simulate a plurality of gestures using a robotic device using the pronged structure;
program instructions to obtain a response of the plurality of wearable devices to the plurality of gestures through a first plurality of detection units of the robotic device;
program instructions to obtain a plurality of signals in response to simulating the plurality of gestures through a second plurality of detection units;
program instructions to connect a server to the robotic device, wherein the server is configured to: (i) obtain the plurality of signals, and (ii) associate a response of a plurality of ribs in the snake assembly of the robotic device with the plurality of signals as a validation result;
program instructions to identify failures in real time among the plurality of wearable devices based on the validation result; and
program instructions to modify a design of the plurality of wearable devices in response to identifying the failures in real time among the plurality of wearable devices.

14. The computer program product of claim 13, wherein program instructions to obtain the response of the plurality of wearable devices to the plurality of gestures through the first plurality of detection units of the robotic device, comprise:
program instructions to receive a communication comprising a location of a wearable device from a software module of the plurality of wearable devices.

15. The computer program product of claim 13, further comprising:
program instructions to receive a plurality of requests to perform the plurality of gestures, from the server.

16. The computer program product of claim 13, wherein the program instructions to receive the plurality of wearable devices, comprise:
program instructions to adjust a position of an arm unit with the snake assembly in order for the snake assembly of the robotic device to receive the plurality of wearable devices.

17. The computer program product of claim 14, wherein the snake assembly, comprises:
program instructions to place each unit of the plurality of wearable devices over a unit of a plurality of ribs, wherein one unit among the wearable devices is placed on one unit of the plurality of ribs prior to another unit among the wearable device being placed on another unit of the plurality of ribs; and
program instructions to adjust dimensions of each unit of the plurality of ribs, which contain a placed single unit of the plurality of wearable devices in order to tightly fit the plurality of ribs containing the plurality of wearable devices to the arm unit.

18. The computer program product of claim 13, wherein the robotic device, comprises:
a base which supports an arm unit with the snake assembly of the robotic device, wherein the arm unit is coupled to the snake assembly; and
the plurality of ribs receive the plurality of wearable devices and simulate the plurality of gestures.

* * * * *